United States Patent
Vanbesien et al.

(10) Patent No.: US 8,784,547 B2
(45) Date of Patent: *Jul. 22, 2014

(54) LIGHTFAST SOLID INK COMPOSITIONS

(75) Inventors: Daryl W. Vanbesien, Burlington (CA);
Jennifer L. Belelie, Oakville (CA);
Gabriel Iftime, Mississauga (CA);
Corey L. Tracy, Mississauga (CA);
Nathan M. Bamsey, Burlington (CA);
Caroline M. Turek, Mississauga (CA);
Naveen Chopra, Oakville (CA);
Kentaro Morimitsu, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,117

(22) Filed: Jun. 18, 2012

(65) Prior Publication Data

US 2013/0333591 A1    Dec. 19, 2013

(51) Int. Cl.
*C09D 11/02* (2014.01)

(52) U.S. Cl.
USPC .................. 106/31.29; 106/31.61

(58) Field of Classification Search
CPC ........................................... C09D 11/34
USPC .......................... 106/31.29, 31.61
See application file for complete search history.

(56) References Cited

U.S. PATENT DOCUMENTS

| | | |
|---|---|---|
| 4,490,731 A | 12/1984 | Vaught |
| 4,889,560 A | 12/1989 | Jaeger et al. |
| 4,889,761 A | 12/1989 | Titterington et al. |
| 5,195,430 A | 3/1993 | Rise |
| 5,221,335 A | 6/1993 | Williams et al. |
| 5,231,135 A | 7/1993 | Machell et al. |
| 5,372,852 A | 12/1994 | Titterington et al. |
| 5,389,958 A | 2/1995 | Bui et al. |
| 5,496,879 A * | 3/1996 | Griebel et al. ................ 524/320 |
| 5,621,022 A | 4/1997 | Jaeger et al. |
| 5,779,779 A * | 7/1998 | Jolly ......................... 106/31.29 |
| 5,902,390 A * | 5/1999 | Malhotra et al. ........... 106/31.58 |
| 5,931,995 A * | 8/1999 | Malhotra et al. ........... 106/31.58 |
| 6,132,665 A * | 10/2000 | Bui et al. ...................... 264/308 |
| 6,221,137 B1 | 4/2001 | King et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,585,816 B1 * | 7/2003 | Smith et al. ................ 106/31.29 |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |

(Continued)

OTHER PUBLICATIONS

Morimitsu—U.S. Appl. No. 13/457,323, filed Apr. 26, 2012.

(Continued)

*Primary Examiner* — Veronica F Faison
(74) *Attorney, Agent, or Firm* — Pillsbury Winthrop Shaw Pittman LLP

(57) ABSTRACT

A solid ink composition comprising an amorphous component, a crystalline material, and optionally, a colorant, which are suitable for ink jet printing, including printing on coated paper substrates. In embodiments, the solid ink formulation comprises a blend of an amorphous and crystalline components which provides a dye-based solid ink with excellent robustness when forming images or printing on coated paper substrates as well as excellent lightfastness.

19 Claims, 1 Drawing Sheet

(56) References Cited

U.S. PATENT DOCUMENTS

| | | |
|---|---|---|
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,427,323 B1 | 9/2008 | Birau et al. |
| 8,287,632 B1 * | 10/2012 | Morimitsu et al. ........ 106/31.29 |
| 8,328,924 B2 * | 12/2012 | Morimitsu et al. ........ 106/31.29 |
| 8,372,189 B2 * | 2/2013 | Chopra et al. ............ 106/31.29 |
| 8,465,579 B2 * | 6/2013 | Morimitsu et al. ........ 106/31.61 |
| 8,500,896 B2 * | 8/2013 | Morimitsu et al. ........ 106/31.61 |
| 8,506,040 B2 * | 8/2013 | Belelie et al. ................. 347/20 |
| 8,506,694 B2 * | 8/2013 | Odell et al. ................ 106/31.13 |
| 2004/0021754 A1 * | 2/2004 | Kremers et al. ............. 347/100 |
| 2011/0177247 A1 | 7/2011 | Vanbesien et al. |
| 2012/0274698 A1 * | 11/2012 | Morimitsu et al. ............ 347/20 |
| 2012/0274700 A1 * | 11/2012 | Belelie et al. ................. 347/20 |

OTHER PUBLICATIONS

Morimitsu—U.S. Appl. No. 13/457,221, filed Apr. 26, 2012.
Morimitsu—U.S. Appl. No. 13/456,916, filed Apr. 26, 2012.
Chopra—U.S. Appl. No. 13/456,619, filed Apr. 26, 2012.
Morimitsu—U.S. Appl. No. 13/095,795, filed Apr. 27, 2011.
Morimitsu—U.S. Appl. No. 13/095,784, filed Apr. 27, 2011.
Chopra—U.S. Appl. No. 13/095,555, filed Apr. 27, 2011.

* cited by examiner

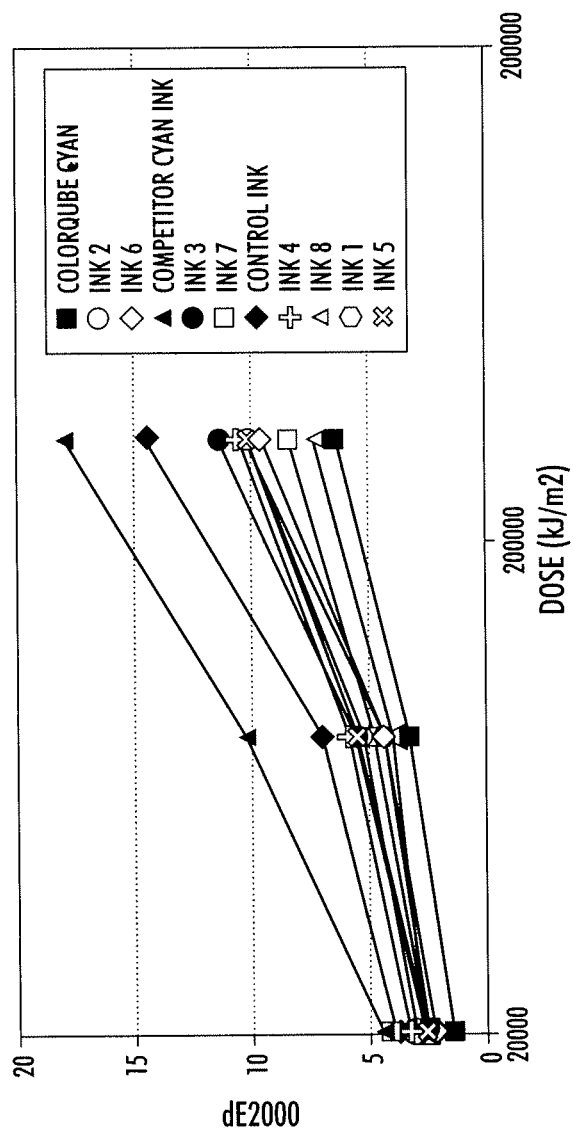

LIGHTFAST SOLID INK COMPOSITIONS

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising an amorphous component, a crystalline material, and optionally a colorant, and methods of making the same. In particular, the present inks are dye-based inks comprising ultra violet (UV) absorbers and which exhibit improved lightfastness.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, solid or phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for solid ink compositions and future printing technologies to provide customers with excellent image quality on all substrates.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided novel solid ink compositions comprising a mixture of crystalline and amorphous components that exhibit excellent image robustness for ink jet printing, including printing on coated paper substrates.

In particular, a phase change ink comprising: at least a crystalline component; at least an amorphous component; an ultraviolet absorber; and a colorant, wherein the phase change ink exhibits from about 30 to about 100% decrease in International Commission on Illumination (CIE) delta E 2000 after exposure to light as compared to a phase change ink without the UV absorber.

In further embodiments, there is provided a phase change ink comprising: at least a crystalline component; at least an amorphous component; an ultraviolet absorber, wherein the ultraviolet absorber is a triazole derivative; and a dye, wherein the phase change ink exhibits from about 30 to about 100% decrease in CIE delta E 2000 after exposure to light as compared to a phase change ink without the UV absorber.

In yet other embodiments, there is provided a phase change ink comprising: at least a crystalline component having a viscosity of less than 12 cps at a temperature of about 140° C. and a viscosity of greater than $1\times10^6$ cps at room temperature; at least an amorphous component having a viscosity of less than 100 cps at a temperature of about 140° C. and a viscosity of greater than $1\times10^6$ cps at room temperature; an ultraviolet absorber; and a colorant, wherein the phase change ink exhibits from about 30 to about 100% decrease in CIE delta E 2000 after exposure to light as compared to a phase change ink without the UV absorber.

BRIEF DESCRIPTION OF THE DRAWINGS

For a better understanding of the present embodiments, reference may be had to the accompanying FIGURE.

The FIGURE shows lightfastness measurements for inks made according to the present embodiments.

DETAILED DESCRIPTION

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature (e.g., 20-27° C.) and molten at an elevated temperature at which the molten ink is applied to a substrate. As discussed above, while current ink options are successful for porous paper substrates, these options are not always satisfactory for coated paper substrates.

It has been discovered that using a mixture of crystalline and amorphous components in solid ink formulations provides robust inks, and in particular, solid inks which demonstrate robust images on uncoated and coated paper. Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (≤140° C.). In the present embodiments, however, it is discovered that a robust solid ink can be obtained through a blend of crystalline and amorphous components.

The present embodiments provide a new type of ink jet solid ink composition which comprises a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10. In one embodiment, the weight ratio is 70:30 for the crystalline and amorphous components, respectively. In another embodiment, the weight ratio is 80:20 for the crystalline and amorphous components, respectively. Each component imparts specific properties to the solid inks, and the blend of the components provide inks that exhibit excellent robustness on uncoated and coated substrates.

The Amorphous Compound

In embodiments, the amorphous compound may comprise an ester of tartaric acid of Formula I or an ester of citric acid of Formula II shown below:

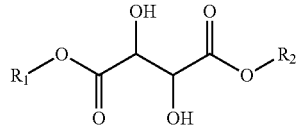

Formula I

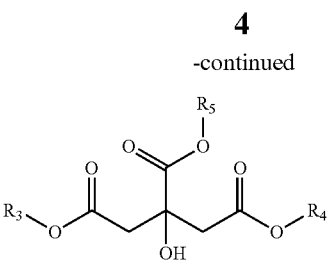

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof.

In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl.

Referring to Formula I, in certain embodiments, one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiment, $R_1$ and $R_2$ are each 2-isopropyl-5-methylcyclohexyl. In certain embodiment, $R_1$ is 2-isopropyl-5-methylcyclohexyl and $R_2$ is 4-t-butylcyclohexyl. In certain embodiment, $R_1$ is 2-isopropyl-5-methylcyclohexyl and $R_2$ is cyclohexyl. In certain embodiment, $R_1$ is 4-t-butylcyclohexyl and $R_2$ is cyclohexyl.

Referring to Formula II, in certain embodiments, one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_3$ is 4-t-butylcyclohexyl and $R_4$ and $R_5$ are each cyclohexyl Some suitable amorphous materials are disclosed in U.S. patent application Ser. No. 13/095,784 to Morimitsu et al., which is hereby incorporated by reference in its entirety. The amorphous materials may comprise an ester of tartaric acid having a formula of

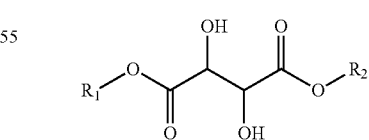

wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, $R_1$ and $R_2$ are each 2-isopropyl-5-methylcyclohexyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

The amorphous compound may comprise an ester of citric acid disclosed in U.S. patent application Ser. No. 13/095,795 to Morimitsu et al., which is hereby incorporated by reference in its entirety. These amorphous materials are synthesized by an esterification reaction of citric acid. In particular, citric acid was reacted with a variety of alcohols to make tri-esters according to the synthesis scheme shown in U.S. patent application Ser. No. 13/095,795. The amorphous compounds are synthesized by an esterification reaction of tartaric acid.

These materials show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

In particular, di-DL-menthyl L-tartrate (DMT) was found to be especially suitable for use as an amorphous compound in the present ink embodiments.

To synthesize the amorphous component, tartaric acid was reacted with a variety of alcohols to make di-esters as shown in the synthesis scheme shown in U.S. patent application Ser. No. 13/095,784. A variety of alcohols may be used in the esterification such as, for example, menthol, isomenthol, neomenthol, isoneomenthol and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2-, 3-, or 4-tert-butyl-cyclohexanol). In embodiments, two or more molar equivalents of alcohol may be used in the reaction to produce the di-esters of tartaric acid. If one molar equivalent of alcohol is used, the result is mostly mono-esters.

In certain embodiments, the amorphous compound comprises bis(2-isopropyl-5-methylcyclohexyl) L-tartrate or (4-t-butylcyclohexyl)-(cyclohexyl)-L-tartrate and any stereoisomers.

Other suitable amorphous components include those disclosed in U.S. patent application Ser. No. 13/095,795 to Morimitsu et al., which is hereby incorporated by reference in its entirety. The amorphous materials may comprise a compound having the following structure:

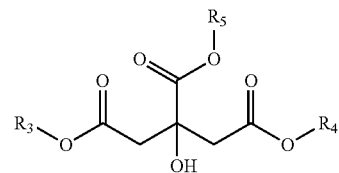

wherein $R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof. In particular, tri-DL-menthyl citrate (TMC) is a desirable amorphous candidate which affords suitable thermal and rheological properties as well imparts robustness to the print images.

These amorphous materials are synthesized by an esterification reaction of citric acid. In particular, citric acid was reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

In embodiments, the amorphous compound may comprise a diurethane compound having a formula of:

Formula III

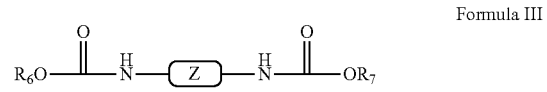

wherein Z is selected from the group consisting of:

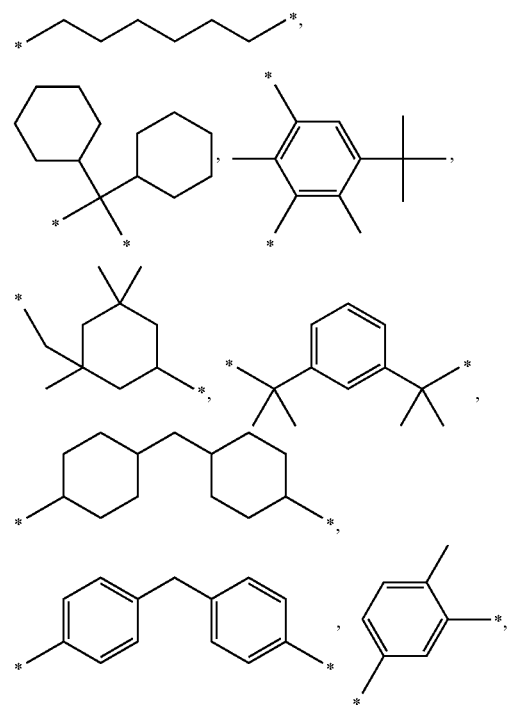

-continued

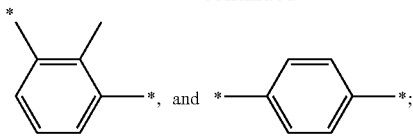
, and wherein Z can be attached to either side of the nitrogen atom of the diurethane formula through the bond labeled with *; each $R_6$ and $R_7$ is i) an alkyl group wherein the alkyl can be linear or branched having from about 1 to about 8 carbon atoms, or ii) an aryl group; with the proviso that when Z is —$(CH_2)_6$—, both $R_6$ and $R_7$ are not —$(CH_2)_n$—$C_6H_6$ wherein n=0-4. Each $R_6$ and $R_7$ can be any linear or branched alkyl including methyl, ethyl, propyl, (n-, iso-, sec- and t-) butyl, (n-, iso-, t- and the like) pentyl, (n-, iso-, t- and the like) hexyl, (n-, iso-, t- and the like) heptyl, or (n-, iso-, t- and the like) octyl.

In certain embodiments, $R_6$ and $R_7$ is independently selected from the group consisting of:

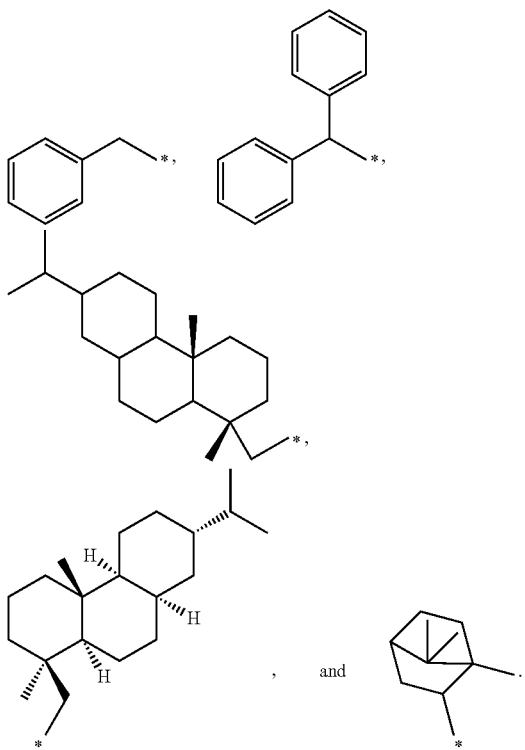
, and

In certain embodiments, z is —$(CH_2)_6$— and both $R_6$ and $R_7$ are

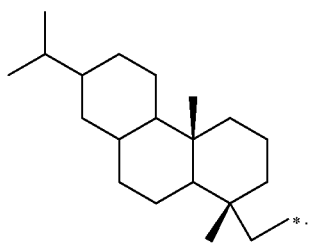 [SMILES: CC[C@@]1(C)CCC[C@@]2(C)C3CCC(C(C)C)CC3CCC12]

$R_6$ and $R_7$ can also be fused ring alcohols, hydroabietyl alcohol (e.g. rosin alcohols), isoborneol, and octyl phenol ethoxylate (such as Igepal CA210, from Rhodia).

These materials show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

In embodiments, the amorphous compounds are formulated with a crystalline compound to form a solid ink composition. The ink compositions show good rheological profiles. Print samples created by the solid ink composition on coated paper by K-proof exhibit excellent robustness. Furthermore, using tartaric acid as an ester base has additional advantages of being low cost, and being obtained from a potential bio-derived source.

In embodiments, the solid ink composition is obtained by using novel amorphous compounds synthesized from tartaric acid and at least one alcohol in an esterification reaction. The solid ink composition comprises the amorphous compound in combination with a crystalline compound and a colorant. The present embodiments comprise a balance of amorphous and crystalline compounds to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present esters of tartaric acid, which provide amorphous compounds for the solid inks, have been discovered to produce robust inks having desirable rheological profiles and that meet the many requirements for inkjet printing.

In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound

The crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., which is hereby incorporated by reference in its entirety. These crystalline materials comprise the following structure:

Formula IV

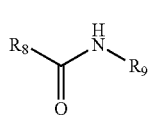

wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components include those disclosed in U.S. patent application Ser. No. 13/456,916 to Morimitsu et al., which is hereby incorporated by reference in its entirety. These crystalline materials comprise the following structure:

Formula V wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Non-limited examples of crystalline aromatic ether include

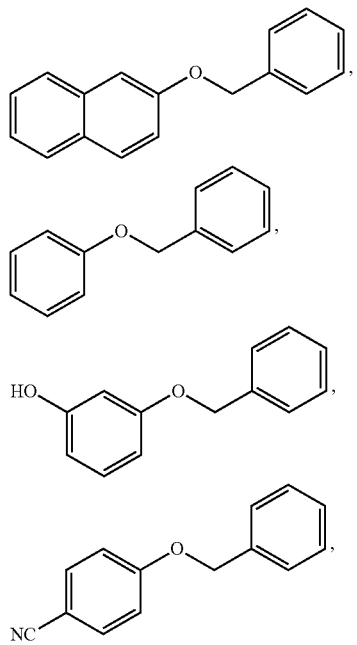

-continued

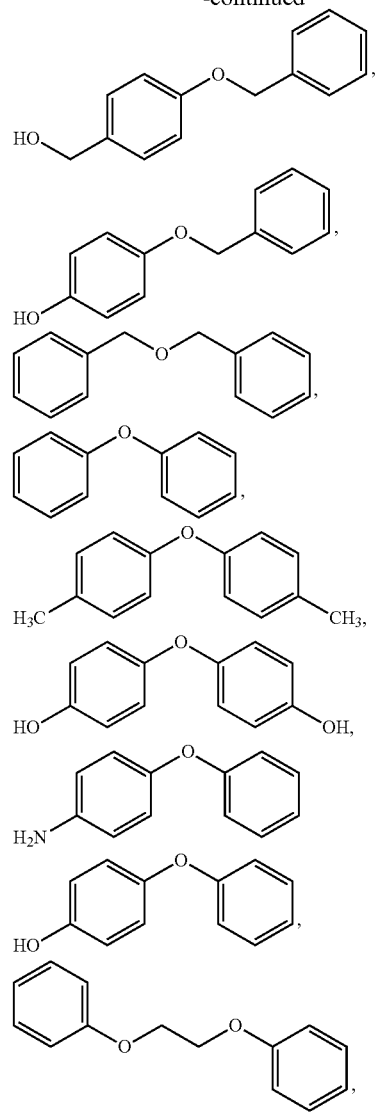

and mixtures thereof.

Suitable crystalline components include those disclosed in U.S. patent application Ser. No. 13/095,555 to Chopra et al., which is hereby incorporated by reference in its entirety. These crystalline materials comprise an ester of an aliphatic linear diacid having the following structure:

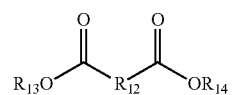

Formula VI wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components include those disclosed in U.S. patent application Ser. No. 13/456,619 to Chopra et al., which is hereby incorporated by reference in its entirety. These crystalline materials comprise diurethanes having the following structure:

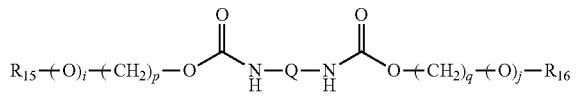

Formula VII wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components include those disclosed in U.S. patent application Ser. No. 13/457,323 to Morimitsu et al., which is hereby incorporated by reference in its entirety. These crystalline component being a sulfone compound having the following structure:

 Formula VIII wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hydroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

The crystalline compound may comprise an ester of tartaric acid of the following formula:

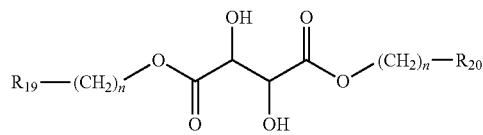

Formula IX wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethyoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

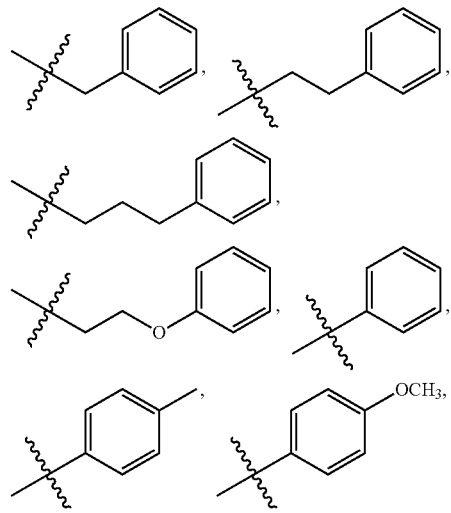

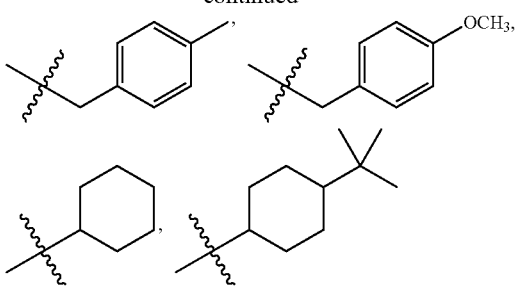

and mixtures thereof.

In certain embodiments, the tartaric acid backbone is selected from L-(+)-tartaric acid, D-(−)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis (2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and mixtures thereof.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

In embodiments, the crystalline material is present an amount of from about 60 percent to about 95 percent by weight, or from about 65 percent to about 95 percent by weight, or from about 70 percent to about 90 percent by weight of the total weight of the ink composition.

In embodiments, the ink carriers for the phase change inks may have melting points of from about 65° C. to about 150° C., for example from about 70° C. to about 140° C., from about 75° C. to about 135° C., from about 80° C. to about 130° C., or from about 85° C. to about 125° C. as determined by, for example, by differential scanning calorimetry at a rate of 10° C./min. In embodiments, the resulting ink has a melting point of from about 65 to about 140° C., or from about 65 to about 135° C., or from about 70 to about 130° C. In embodiments, the resulting ink has a crystallization point of from about 65 to about 130° C., or from about 66 to about 125° C., or from about 66 to about 120° C. In further embodiments, the resulting ink has a viscosity of from about 1 to about 15 cps, or from about 2 to about 14 cps, or from about 3 to about 13 cps at about 140° C. At room temperature, the resulting ink has a viscosity of about $\geq 10^6$ cps.

Ultraviolet (UV) Absorber

Dye-based solid ink compositions are sometimes prone to color degradation over time due to the poor lightfastness of the dyes. Light fastness is defined as the ability of the color of the ink (for example, during storage or in the printed image) to remain the original color without degradation or fading of the color through exposure to the environment. The present embodiments provide solution to the color degradation by incorporating one or more UV absorbers in low concentrations into the solid ink compositions. Incorporation of UV absorbers into the solid ink compositions have demonstrated substantial improvement in the lightfastness of the solid inks. For example, inks incorporating the UV absorbers exhibited up to 100% decrease in delta E 2000 after exposure to light as compared to the same ink without the UV absorber. In embodiments the inventive inks exhibited from about 30% to about 100% decrease in delta E 2000, or from about 40% to about 100% decrease in delta E 2000, after exposure to light as compared to the same ink without the UV absorber. The color difference, or $\Delta E$, between a sample color $L_2 a_2 b_2$ and a reference color $L_1 a_1 b_1$ is:

$$\Delta E = \sqrt{\left(\frac{\Delta L'}{K_L S_L}\right)^2 + \left(\frac{\Delta C'}{K_C S_C}\right)^2 + \left(\frac{\Delta H'}{K_H S_H}\right)^2 - R_T \left(\frac{\Delta C'}{K_C S_C}\right)\left(\frac{\Delta H'}{K_H S_H}\right)}$$

where $$\overline{L}' = (L_1 + L_2)/2$$

$$C_1 = \sqrt{a_1^2 + b_1^2}$$

$$C_2 = \sqrt{a_2^2 + b_2^2}$$

$$\overline{C} = (C_1 - C_2)/2$$

$$G = \left(1 - \sqrt{\frac{\overline{C}^7}{\overline{C}^7 + 25^7}}\right)/2$$

$$a'_1 = a_1(1 + G)$$

$$a'_2 = a_2(1 + G)$$

$$C'_1 = \sqrt{a_1'^2 + b_1^2}$$

$$C'_2 = \sqrt{a_2'^2 + b_2^2}$$

$$\overline{C}' = (C'_1 + C'_2)/2$$

$$h'_1 = \begin{cases} \tan^{-1}(b_1/a'_1) & \tan^{-1}(b_1/a'_1) \geq 0 \\ \tan^{-1}(b_1/a'_1) - 360° & \tan^{-1}(b_1/a'_1) < 0 \end{cases}$$

$$h'_2 = \begin{cases} \tan^{-1}(b_2/a'_2) & \tan^{-1}(b_2/a'_2) \geq 0 \\ \tan^{-1}(b_2/a'_2) + 360° & \tan^{-1}(b_2/a'_2) < 0 \end{cases}$$

$$\overline{H}' = \begin{cases} (h'_1 + h'_2 + 360°)/2 & |h'_1 - h'_2| > 180° \\ (h'_1 + h'_2)/2 & |h'_1 - h'_2| \leq 180° \end{cases}$$

$$T = 1 - 0.17\cos(\overline{H}' - 30°) + 0.24\cos(2\overline{H}') + 0.32\cos(3\overline{H}' + 6°) - 0.20\cos(4\overline{H}' - 63°)$$

$$\Delta h' = \begin{cases} h'_2 - h'_1 & |h'_2 - h'_1| \leq 180° \\ h'_2 - h'_1 + 360° & |h'_2 - h'_1| > 180°; h'_2 \leq h'_1 \\ h'_2 - h'_1 - 360° & |h'_2 - h'_1| > 180°; h'_2 > h'_1 \end{cases}$$

$$\Delta L' = L_2 - L_1$$

$$\Delta C' = C'_2 - C'_1$$

$$\Delta H' = 2\sqrt{C'_1 C'_2} \sin(\Delta h'/2)$$

$$S_L = 1 + \frac{0.015(\overline{L}' - 50)^2}{\sqrt{20 + (\overline{L}' - 50)^2}}$$

$$S_C = 1 + 0.045 \overline{C}'$$

$$S_H = 1 + 0.015 \overline{C}' T$$

$$\Delta \theta = 30 \exp\left\{-\left(\frac{\overline{H}' - 275°}{25}\right)^2\right\}$$

-continued $$R_C = \sqrt{\frac{\overline{C}'^7}{\overline{C}'^7 + 25^7}}$$

$$R_T = -2R_C \sin(2\Delta\theta)$$

$K_L = 1$ default $K_C = 1$ default

Suitable UV absorbers have a number of specific characteristics, such as, little to no color, dissolve and/or disperse into the ink base, and have a melting point below the jetting temperature (e.g., from about 130° C. to about 140° C.). In the present disclosure, UV absorbers are said to have little to no color if prints prepared using CMYK ink with UV absorber compared to prints prepared using CMYK ink plus UV absorber have a CIE delta E 2000<2. In embodiments, the UV absorbers are triazole derivatives. Triazole derivatives have been discovered to provide unexpectedly superior results in lightfastness, even in comparison to other UV absorbers such as benzophenone absorbers. Specific examples of UV absorbers include those shown in Table 3, and are available from Mayzo (Suwanee, Ga.).

TABLE 3

| Chemical Name | Chemical Formula | Melting Point (° C.) |
| --- | --- | --- |
| 2-(2-hydroxy-5-tert-octylphenyl) benzotriazole | | 102-106 |
| 2-(2H-Benzotriazole-2-yl)-4-methylphenyl | | 128-132 |
| 2-(2'-Hydroxy-3',5'-di-tert-amylphenyl) benzotriazole | | 80-88 |

In the above table, "-t" in 2-(2-hydroxy-5-tert-octylphenyl) benzotriazole is defined as "tertiary."

The UV absorbers are present in the solid ink in an amount of up to 5.0% by weight of the total weight of the ink composition. In other embodiments, the UV absorbers are present in an amount of from about 0.01% to about 5% or from about 0.3% to about 2.0% by weight of the total weight of the ink composition.

Other Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl) isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorants

In embodiments, the phase change ink compositions described herein also include a colorant. The ink of the present embodiments can thus be one with or without colorants. The solid ink may optionally contain colorants such as dyes. The colorants can be either from the cyan, magenta, yellow, black (CMYK) set or from spot colors obtained from custom color dyes or mixtures of dyes. Dye-based colorants are miscible with the ink base composition, which comprises the crystalline and amorphous components and any other additives.

Any dye may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Solvent Blue 48, Solvent Blue 70, Solvent Blue 117, Solvent Black 29, Solvent Black 45, Disperse Red 60, Disperse Red 343, Solvent Yellow 72, Solvent Yellow 114, Solvent Yellow 141, Solvent Yellow 145, Solvent Yellow 146, Disperse Yellow 8, Disperse Yellow 64, Disperse Yellow 241, Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (CA. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Ink Base

An ink base was prepared with the crystalline and amorphous components shown in Table 4.

| Ink Base Component | Crystalline Component | Amorphous Component |
|---|---|---|
| (structure) | (structure) | (structure) |
| Amount (wt %) | 80 | 20 |

As shown above, the example ink comprised 80% crystalline resin and 20% amorphous resin. As a colorant, 2% by weight of a dye was added. In the example, Solvent Blue 67 was used for cyan color (available as Orasol Blue GN from Pylam Products Company Inc. (Tempe, Ariz.)).

Example 2

Preparation of Example Inks

The following inks were prepared with a predetermined amount of UV absorber shown in Table 5, 2% Orasol Blue GN, and the remainder consisting of ink base (80% Resin 80, 20% DMT). Inks were prepared by adding the components together in a beaker and heating to 140° C. while stirring, and maintaining heat for one hour.

K-proofs of the cyan inks were printed onto Xerox® digital Color Elite Gloss, 120 gsm (DCEG) coated papers using the K-proofer gravure printing plate, which is rigged with a pressure roll set at low pressure. K-proof refers to a gravure offset plate used to produce a roughly 2×4 inch image. The gravure plate temperature was set at 142° C., but the actual plate temperature is about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates, before an ink formulation is scaled up and optimized for more in-depth inkjet printing tests. The K-proofs of the cyan inks were compared to commercially available inks (Color Qube Cyan and a competitor cyan ink) printed in the same manner.

TABLE 5

| Ink Sample | UV Absorber |
|---|---|
| Control | None |
| 1 | 0.5% 2-Hydroxy-4-n-Octoxybenzophenone |
| 2 | 1.0% 2-Hydroxy-4-n-Octoxybenzophenone |
| 3 | 0.5% 2-(2-hydroxy-5-tert-octylphenyl) benzotriazole |
| 4 | 1.0% 2-(2-hydroxy-5-tert-octylphenyl) benzotriazole |
| 5 | 0.5% 2-(2H-Benzotriazole-2-yl)-4-methylphenyl |
| 6 | 1.0% 2-(2H-Benzotriazole-2-yl)-4-methylphenyl |
| 7 | 0.5% 2-(2'-Hydroxy-3',5'-di-tert-amylphenyl) benzotriazole |
| 8 | 1.0% 2-(2'-Hydroxy-3',5'-di-tert-amylphenyl) benzotriazole |

TABLE 6

| Dose (kJ/m$^2$) |
|---|
| 0 |
| 2,520 |
| 10,080 |
| 40,320 |
| 161,280 |

The FIGURE shows the CIE delta E 2000 measurements of all inks. The corresponding data is provided in Table 7 below.

TABLE 7

| Ink | UV Absorber | UV Absorber Content (wt %) | 2520 (kJ/m2) | 10080 (kJ/m2) | 40320 (kJ/m2) | 161280 (kJ/m2) | % decrease in CIE delta E 2000 compared to control |
|---|---|---|---|---|---|---|---|
| | | | Delta_E2000 Color shift on exposure | | | | |
| ColorQube Cyan Ink | — | — | 0.5 | 1.4 | 3.3 | 6.4 | |
| Competitor Cyan Ink | — | — | 1.3 | 4.4 | 10.3 | 18.0 | |
| Control Ink | — | — | 2.7 | 3.9 | 7.0 | 14.5 | 0 (Control) |
| Ink 1 | 2-Hydroxy-4-n-Octoxybenzophenone | 0.5 | 1.0 | 2.5 | 4.3 | 10.3 | 29.1 |
| Ink 2 | 2-Hydroxy-4-n-Octoxybenzophenone | 1 | 1.6 | 3.0 | 5.2 | 10.2 | 29.8 |
| Ink 3 | 2-(2-hydroxy-5-tert-octylphenyl) benzotriazole | 0.5 | 0.8 | 2.7 | 5.6 | 11.4 | 21.3 |
| Ink 4 | 2-(2-hydroxy-5-tert-octylphenyl) benzotriazole | 1 | 1.4 | 3.2 | 5.8 | 10.6 | 27.2 |
| Ink 5 | 2-(2H-Benzotriazole-2-yl)-4-methylphenyl | 0.5 | 1.1 | 2.6 | 5.5 | 10.1 | 30.1 |
| Ink 6 | 2-(2H-Benzotriazole-2-yl)-4-methylphenyl | 1 | 1.1 | 2.2 | 4.3 | 9.6 | 33.8 |
| Ink 7 | 2-(2'-Hydroxy-3',5'-di-tert-amylphenyl) benzotriazole | 0.5 | 1.5 | 2.6 | 4.8 | 8.4 | 41.9 |
| Ink 8 | 2-(2'-Hydroxy-3',5'-di-tert-amylphenyl) benzotriazole | 1 | 1.2 | 2.7 | 4.0 | 7.3 | 49.4 |

Lightfastness

Lightfastness testing was performed in the following manner: K-proof prints were placed under a light source with a spectra simulating the spectra of solar radiation at ground level behind window glass (Exposure: Atlas Suntest XLS+, Filter set C ("window glass"), BST=50° C., Phi=700W/m2). A photo mask was placed over ⅘ of the image until the exposed section of the K-proof was exposed to a predetermined amount of light (shown in Table 6). The photo mask was then raised by ⅕ so that now ⅖ of the image was exposed to light. This was repeated until all but ⅕ of the image was exposed to light to generate a range of exposure doses on a single proof. The color of each section was measured using an X-rite 528 (D65 Illuminant, 2° Observer Angle). CIE delta E 2000 was calculated with the reference being the ⅕ of the k-proof that was not exposed to light.

As seen, the ink with the worst result for lightfastness is the Competitor cyan ink, followed by the Control Ink with no UV absorber. Of the example inks, with and without the UV absorber, the best performance was found to be for the formulation containing 1% Mayzo BLS 1328. It is clear from the FIGURE that the UV absorbers selected provided a significant improvement to lightfastness, improving the lightfastness by up to a factor of 2. From the data obtained, inks incorporating the UV absorbers exhibited at least a 50% decrease in ΔE after exposure to 161280 KJ/m2 of light as compared to the same ink without the UV absorber. For example, if the control exhibited a color change of 10, then the inventive embodiment with the UV absorber would exhibit a color change of 5 or less. It is also expected that inventive inks comprising the UV absorber can exhibit up to 100% decrease in CIE delta E 2000 as compared to a control ink (the same ink without the UV absorber). Since the UV absorbers readily melt and blend into the ink and are at a very low concentration in the ink, jetting should not present an issue.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
    at least a crystalline component selected from the group consisting of an amide, aromatic ester, linear diester, urethanes, sulfones, tartaric acid ester derivatives with aromatic groups and mixtures thereof;
    at least an amorphous component selected from the group consisting of tartaric acid ester derivatives, citric acid ester derivatives, diurethanes;
    at least one ultraviolet absorber being a triazole derivative; and
    a colorant.

2. The phase change ink of claim 1 having a ratio of crystalline to amorphous ratio of from about 60:40 to about 95:5, respectively.

3. The phase change ink of claim 1 having improved lightfastness as exhibited from about 30 to about 100% decrease in CIE delta E 2000 after exposure to light as compared to a phase change ink without the UV absorber.

4. The phase change ink of claim 1, wherein the ultraviolet absorber is selected from the group consisting of 2-(2-hydroxy-5-tert-octylphenyl)benzotriazole, 2-(2H-Benzotriazole-2-yl)-4-methylphenyl, 2-(2'-Hydroxy-3',5'-di-tert-amylphenyl)benzotriazole, and mixtures thereof.

5. The phase change ink of claim 1, wherein the ultraviolet absorber is present in an amount of up to about 5%.

6. The phase change ink of claim 5, wherein the ultraviolet absorber is present in an amount of from about 0.01% to about 5%.

7. The phase change ink of claim 1, wherein the ultraviolet absorber is has no color.

8. The phase change ink of claim 1, wherein the ultraviolet absorber has a melting point below a temperature of from about 130° C. to about 140° C.

9. The phase change ink of claim 1 having a viscosity of less than 10 cps at a temperature of about 140° C.

10. The phase change ink of claim 1 having a viscosity of greater than about $10^6$ cps at room temperature.

11. The phase change ink of claim 1 having a melting point of less than 140° C.

12. The phase change ink of claim 1 having a $T_{crys}$ of greater than 65° C.

13. The phase change ink of claim 1 exhibiting lightfastness increased by a factor of 2 as compared to a phase change ink without the UV absorber.

14. The phase change ink of claim 1, wherein the colorant is a dye selected from the group consisting of blue dye, black dye, red dye, yellow dye, and mixtures thereof.

15. A phase change ink comprising:
    at least a crystalline component selected from the group consisting of an amide, aromatic ester, linear diester, urethanes, sulfones, tartaric acid ester with aromatic groups and mixtures thereof;
    at least an amorphous component selected from the group consisting of tartaric acid ester derivatives, citric acid ester derivatives, diurethanes;
    at least one ultraviolet absorber, wherein the at least one ultraviolet absorber is a triazole derivative; and
    a dye, wherein the phase change ink exhibits from about 30 to about 100% decrease in CIE delta E 2000 after exposure to light as compared to a phase change ink without the UV absorber.

16. The phase change ink of claim 15, wherein the phase change ink exhibits from about 40 to about 100% decrease in CIE delta E 2000 after exposure to light as compared to a phase change ink without the UV absorber.

17. The phase change ink of claim 15, wherein the ultraviolet absorber is selected from the group consisting of 2-(2-hydroxy-5-tert-octylphenyl)benzotriazole, 2-(2H-Benzotriazole-2-yl)-4-methylphenyl, 2-(2'-Hydroxy-3', 5'-di-tert-amylphenyl)benzotriazole, and mixtures thereof.

18. The phase change ink of claim 15, wherein the ultraviolet absorber is present in an amount of up to about 5%.

19. A phase change ink comprising:
    at least a crystalline component selected from the group consisting of an amide, aromatic ester, linear diester, urethanes, sulfones, tartaric acid ester derivatives with aromatic groups and mixtures thereof and having a viscosity of less than 12 cps at a temperature of about 140° C. and a viscosity of greater than $1 \times 10^6$ cps at room temperature;
    at least an amorphous component selected from the group consisting of tartaric acid ester derivatives, citric acid ester derivatives, diurethanes and having a viscosity of less than 100 cps at a temperature of about 140° C. and a viscosity of greater than $1 \times 10^6$ cps at room temperature;
    at least one ultraviolet absorber; and
    a colorant, wherein the phase change ink exhibits from about 30 to about 100% decrease in CIE delta E 2000 after exposure to light as compared to a phase change ink without the UV absorber.

* * * * *